(12) United States Patent
Nakayama

(10) Patent No.: US 7,188,132 B2
(45) Date of Patent: Mar. 6, 2007

(54) HADAMARD TRANSFORMATION METHOD AND APPARATUS

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 10/322,598

(22) Filed: Dec. 19, 2002

(65) Prior Publication Data

US 2003/0120691 A1    Jun. 26, 2003

(30) Foreign Application Priority Data

Dec. 25, 2001    (JP)    ............... 2001-392730

(51) Int. Cl.
  *G06F 7/14*    (2006.01)
  *G06K 9/36*    (2006.01)

(52) U.S. Cl. ...................... 708/400; 382/248

(58) Field of Classification Search ............... 708/400, 708/401, 410; 382/248
  See application file for complete search history.

(56) References Cited

U.S. PATENT DOCUMENTS

| 5,687,218 | A | 11/1997 | Nakayama |
| 5,856,935 | A * | 1/1999 | Moy et al. ................. 708/410 |
| 6,732,130 | B2 * | 5/2004 | Shoji ......................... 708/400 |
| 2002/0118757 | A1 * | 8/2002 | Hirase .................... 375/240.18 |

FOREIGN PATENT DOCUMENTS

| JP | 08-205160 | 1/1995 |
| JP | 10-108186 | 9/1996 |
| JP | 11-338853 | 5/1998 |
| JP | 2001-128174 | 10/1999 |
| JP | 2002-262293 | 2/2001 |
| JP | 2004-038451 | 7/2002 |

OTHER PUBLICATIONS

Makoto Hoshino, et al., "Lossless Image Coding Using Hadamard Transform Residue Patterns," The Institute of Electronics, Information and Communication Engineers (IEICE), Technical Report, vol. 97, No. 428, CS97-132, p. 7-12, Dec. 12, 1997.

Makoto Hoshino, et al., "Lossless Image Coding Using a Number-Theoretic Hadamard Transform," The Institute of Electronics, Information and Communication Engineers (IEICE), Technical Report, vol. 96, No. 402, CS96-132, p. 25-30, Dec. 13, 1996.

"Lossless 8-point fast discrete cosine transform using lossless hadamard transform," Fukama, et al., The Institute of Electronics, Information and Communication Engineers, 1999, pp. 37-44.

* cited by examiner

*Primary Examiner*—Chuong D. Ngo
(74) *Attorney, Agent, or Firm*—Fitzpatrick, Cella, Harper & Scinto.

(57) ABSTRACT

The present invention provides a method and apparatus that transforms input signals X0, X1, X2, X3 using a 4-point Hadamard transform matrix, and of the resulting transformation data, rounds up the LSB of the first transformed data and rounds down the LSB of the remaining odd-numbered data. When restoring the data to its original state the rounding is executed after a Hadamard inverse transformation is performed, thereby restoring the data to its original state X0, X1, X2, X3.

22 Claims, 11 Drawing Sheets

FIG. 4

| HADAMARD TRANSFORMATION AND ROUNDING |
|---|
| $Y0 = (X0 + X1 + X2 + X3 + 1) \gg 1$ |
| $Y1 = (X0 - X1 + X2 - X3) \gg 1$ |
| $Y2 = (X0 + X1 - X2 - X3) \gg 1$ |
| $Y3 = (X0 - X1 - X2 + X3) \gg 1$ |

ROUNDING ERROR DURING TRANSFORMATION

|    | TYPE 0 | TYPE 1 | TYPE 2 | TYPE 3 | TYPE 4 | TYPE 5 | TYPE 6 | TYPE 7 |
|----|--------|--------|--------|--------|--------|--------|--------|--------|
| Y0 | −0.5   | +0.5   | +0.5   | +0.5   | +0.5   | −0.5   | −0.5   | −0.5   |
| Y1 | +0.5   | −0.5   | +0.5   | +0.5   | −0.5   | +0.5   | −0.5   | −0.5   |
| Y2 | +0.5   | +0.5   | −0.5   | +0.5   | −0.5   | −0.5   | +0.5   | −0.5   |
| Y3 | +0.5   | +0.5   | +0.5   | −0.5   | −0.5   | −0.5   | −0.5   | +0.5   |

FIG. 7B

PROPAGATED ERROR DURING INVERSE TRANSFORMATION

|    | TYPE 0 | TYPE 1 | TYPE 2 | TYPE 3 | TYPE 4 | TYPE 5 | TYPE 6 | TYPE 7 |
|----|--------|--------|--------|--------|--------|--------|--------|--------|
| E0 | +0.5   | +0.5   | +0.5   | +0.5   | −0.5   | −0.5   | −0.5   | −0.5   |
| E1 | −0.5   | +0.5   | +0.5   | −0.5   | +0.5   | −0.5   | −0.5   | +0.5   |
| E2 | −0.5   | +0.5   | −0.5   | +0.5   | +0.5   | −0.5   | +0.5   | −0.5   |
| E3 | −0.5   | −0.5   | +0.5   | +0.5   | +0.5   | +0.5   | −0.5   | −0.5   |

FIG. 7C

ROUNDING DURING INVERSE TRANSFORMATION

TYPE OF ROUNDING DURING TRANSFORMATION

|    | TYPE 0 | TYPE 1 | TYPE 2 | TYPE 3 | TYPE 4 | TYPE 5 | TYPE 6 | TYPE 7 |
|----|--------|--------|--------|--------|--------|--------|--------|--------|
| R0 | −0.5   | −0.5   | −0.5   | −0.5   | +0.5   | +0.5   | +0.5   | +0.5   |
| R1 | +0.5   | −0.5   | −0.5   | +0.5   | −0.5   | +0.5   | +0.5   | −0.5   |
| R2 | +0.5   | −0.5   | +0.5   | −0.5   | −0.5   | +0.5   | −0.5   | +0.5   |
| R3 | +0.5   | +0.5   | −0.5   | −0.5   | −0.5   | −0.5   | +0.5   | +0.5   |

HADAMARD TRANSFORMATION METHOD AND APPARATUS

FIELD OF THE INVENTION

The present invention relates to Hadamard transformation method and apparatus, and more particularly, to a Hadamard transformation method and apparatus capable of providing a reversible transformation.

BACKGROUND OF THE INVENTION

Images, particularly color images, contain a very large amount of information. This vary large amount of information makes it difficult to store or transmit such images, so high-performance encoding is used to reduce the amount of such data, either by deleting the redundancy of such color images or by encoding the images by altering their contents to the point where picture quality deteriorates noticeably. Thus, for example, with the JPEG recommended by the ISO and ITU-T as the international standard encoding method for data compression and decompression of still images, a discrete cosine transform (DCT) is used to transform each block of image data (8 pixels×8 pixels) into a DCT coefficient, after which the resulting DCT coefficients are individually quantized and the quantized values are entropy encoded to compress the image data. Besides JPEG, this DCT-based compression technique includes H261, MPEG1/2/4, and so on.

One process relating to DCT and to image data conversion is the Hadamard transform. The Hadamard transform is an orthogonal transformation in which each of the elements or entries in the matrix is either 1 or −1. A Hadamard transform can be performed using only addition and subtraction, and is the simplest of orthogonal transformations.

Within the Hadamard transform, a 2-point Hadamard transform matrix $H_2$ is defined as follows:

$$H_2 = \frac{1}{\sqrt{2}}\begin{bmatrix} 1 & 1 \\ 1 & -1 \end{bmatrix} \quad (1)$$

An ordinary N-term Hadamard transform matrix $H_N$ (where $N=2^n$) can be recursively defined by the Kronecker product of an (N/2)-term Hadamard transformation and the foregoing 2-point Hadamard transformation $H_2$ as follows:

$$H_N = H_{N/2} - H_2 \quad (2)$$

$$= \frac{1}{\sqrt{2}}\begin{bmatrix} H_{N/2} & H_{N/2} \\ H_{N/2} & -H_{N/2} \end{bmatrix}$$

From the foregoing definition a 4-point Hadamard transform matrix can be obtained as follows:

$$H_4 = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (3)$$

Such a 4-point Hadamard transform matrix is called a natural matrix, in which the base vectors are not aligned in the order of the sequency. By repeatedly performing permutations of the base vectors so as to move the second line base vector to the forth line, the order of the base vectors becomes the sequence order of the transformation matrix $WH_4$:

$$WH_4 = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (4)$$

This transformation matrix $WH_4$ is called a Walsh-type transformation matrix or a Walsh-Hadamard transform matrix. It is known that a Hadamard transform is a reversible orthogonal transformation, so as long as either the natural- or the Walsh-type matrix can be reversibly transformed the transformation matrix is a symmetrical matrix.

Besides the Walsh-type transformation matrix, there is one other type of symmetrical matrix obtained by permutation the base vectors of the Hadamard transform matrix $H_4$, which is the following matrix $HH_4$:

$$HH_4 = \frac{1}{2}\begin{bmatrix} 1 & 1 & 1 & 1 \\ 1 & -1 & -1 & 1 \\ 1 & -1 & 1 & -1 \\ 1 & 1 & -1 & -1 \end{bmatrix} \quad (5)$$

This transform matrix $HH_4$ has an important meaning in the detailed description of the invention that follows later.

As noted above, it is widely known that the Hadamard transform is reversible, a precondition of which is the retention without rounding of the decimal fraction generated when performing a Hadamard transformation of whole numbers (integers).

Reversibility is lost if the decimal fraction is simply rounded off. For example, a Hadamard transform of the following numbers 123, 78, 84, 56 produces the following results:

170.5(=(123+78+84+56)/2)
36.5(=(123−78+84−56)/2)
30.5(=(123+78−84−56)/2)
8.5(=(123−78−84+56)/2)

Rounding these numbers to integers yields the following:

171, 37, 31, 9 the inverse transformation of which yields the following:

124, 78, 84, 56

As can be seen, the first number 123, by a Hadamard transformation and its inverse transformation, has become 124. Thus, reversibility cannot be guaranteed with the Hadamard transform, which outputs integerized data. Hereinafter, a Hadamard transform that outputs integerized data is called an integer-type Hadamard transformation, and an integer-type Hadamard transformation that can be reversibly transformed is called an integer-type reversible Hadamard transformation.

The present invention is directed to a method of calculating and rounding so as to achieve an integer-type reversible Hadamard transformation.

Conventionally, an integer-type reversible Hadamard transformation is achieved as follows:

(1) Resolve the 4-point Hadamard transform $H_4$ into the product of triangular matrixes whose main diagonal elements are equal to 1
(2) Add a row vector replacing Q to the original transformation matrix
(3) From (1) and (2), resolve $QH_4$ into the following matrix product form.

$$QH_4 = \begin{bmatrix} 1 & 0 & 0 & 0 \\ 0 & 1 & 0 & 0 \\ 0 & -1 & 1 & 0 \\ -1 & 0 & 0 & 1 \end{bmatrix} \begin{bmatrix} 1 & 0 & 1/2 & 1/2 \\ 0 & 1 & 1/2 & -1/2 \\ 0 & 0 & 1 & 0 \\ 0 & 0 & 0 & 1 \end{bmatrix} \begin{bmatrix} -1 & 0 & 0 & 0 \\ 0 & -1 & 0 & 0 \\ 1 & 0 & 1 & 0 \\ 0 & -1 & 0 & 1 \end{bmatrix} \quad (6)$$

(4) Express this transformation as signal flow (as shown in FIG. 1)
(5) Round off any decimal fraction data generated by multiplication during signal flow.

Conventionally, an integer-type reversible Hadamard transformation is achieved by the foregoing steps (1) through (5). A slightly more detailed explanation is given below.

FIG. 1 is a diagram illustrating a signal flow that forms the foundations of achieving a conventional integer-type reversible Hadamard transformation. FIG. 2 is a diagram illustrating the signal flow of the conventional integer-type reversible Hadamard transformation.

The signal flow of FIG. 1 shows a so-called ladder network often used to achieve a reversible transformation. The ladder network shown in FIG. 1 introduces rounding (reference numerals 200 and 201 of FIG. 2) to the nearest integer on the output side of multipliers 100, 101 that generate decimal fraction data, with the reversibility of the transformation that outputs integerized data being used as a common technique (in the field of reversible transformation).

It should be noted that the methods of the rounding 200, 201 can be anything provided that the rounding of the corresponding multiplier outputs is the same for the forward transformation and the inverse transformation.

A signal flow that introduces rounding into the signal flow of FIG. 1 so as to achieve reversibility is shown in FIG. 2, and is the conventional calculation method for achieving an integer-type reversible Hadamard transformation.

The Hadamard transformation defined by equations (3), (4) and (5) above can be achieved by regular addition and subtraction, and can be processed in parallel efficiently SIMD (Single Instruction stream Multiple Data stream)-type commands such as those provided on current CPUs. However, with the above-described conventional reversible transformation calculation method, it is difficult to process using SIMD-type commands and there are few calculations that can be performed in parallel.

In other words, it can be said that the conventional integer-type reversible Hadamard transformation is not suitable for high-speed processing on the personal computers that are now ubiquitous. Similarly, the hardware also experiences extended delays because of the increased number of calculations involved, lengthening the data pass.

SUMMARY OF THE INVENTION

Accordingly, the present invention is proposed in order to solve the above-described problems of the conventional art, and has as its object to provide a Hadamard transformation method and apparatus that achieves an integer-type reversible Hadamard transformation by rounding up the last bit of odd number of data in the transformed data obtained by Hadamard transformation and rounding down the last bit of the remaining odd number of data.

Another object of the present invention is to provide a Hadamard transformation method and apparatus that achieves an integer-type reversible Hadamard transformation by simultaneously rounding up the last bit of odd number of transformation output and rounding down the last bit of the remaining odd number of transformation output as well as performing a Hadamard transformation.

Another and further object of the present invention is to provide a Hadamard transformation method and apparatus capable of performing integer-type reversible Hadamard transformations with little delay and a simple structure.

In order to attain the above-described objects, a Hadamard transformation and inverse transformation method of the present invention comprising: a transformation step of performing a Hadamard transformation of an input signal using a Hadamard transform matrix; and a rounding step of rounding up the least significant bit of odd number of data in the transformed data transformed in said transformation step and rounding down the LSB of remaining odd number of data.

Other features, objects and advantages of the present invention will be apparent from the following detailed description taken in conjunction with the accompanying drawings, in which like reference characters designates the same or similar parts throughout the figures thereof.

BRIEF DESCRIPTION OF THE DRAWINGS

The accompanying drawings, which are incorporated in and constitute a part of the specification, illustrate embodiments of the present invention and, together with the detailed description, serve to explain the principle of the present invention, in which:

FIG. 4 is a flow chart illustrating the Hadamard transformation and a rounding variation according to the first embodiment of the present invention;

FIGS. 7A, 7B and 7C are diagrams illustrating errors generated by rounding during a reversible Hadamard transformation of 8 sets, errors propagated by the inverse transformations corresponding to the transformations, and errors generated by rounding during said inverse transformations, respectively, according to a third embodiment of the present invention;

DETAILED DESCRIPTION OF THE PREFERRED EMBODIMENTS

Preferred embodiments of the present invention will be described in detail in accordance with the accompanying drawings.

[First Embodiment]

Figure 1:
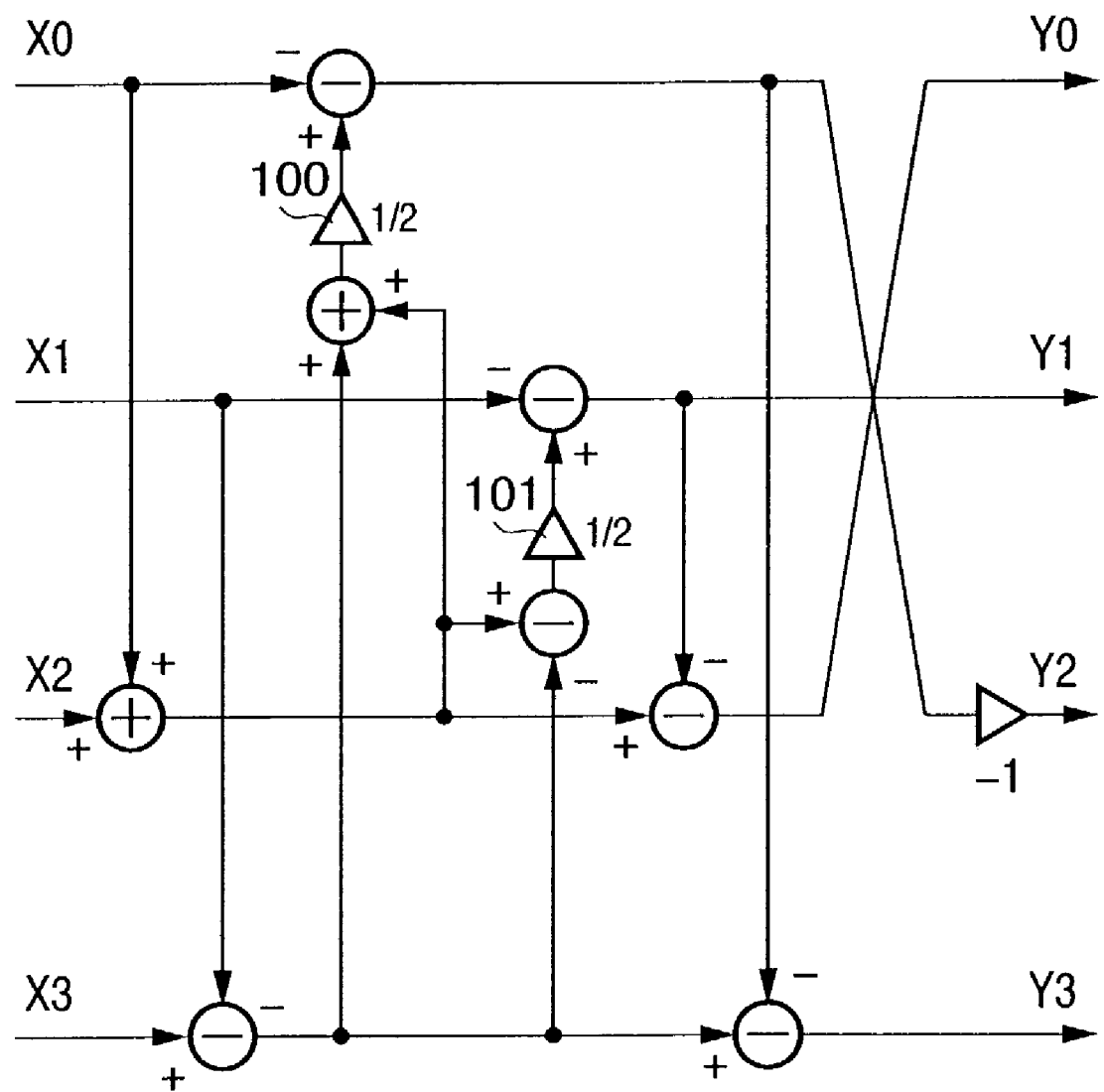
FIG. 1 is a diagram illustrating a signal flow that forms the foundations of achieving a conventional integer-type reversible Hadamard transformation.
Figure 2:
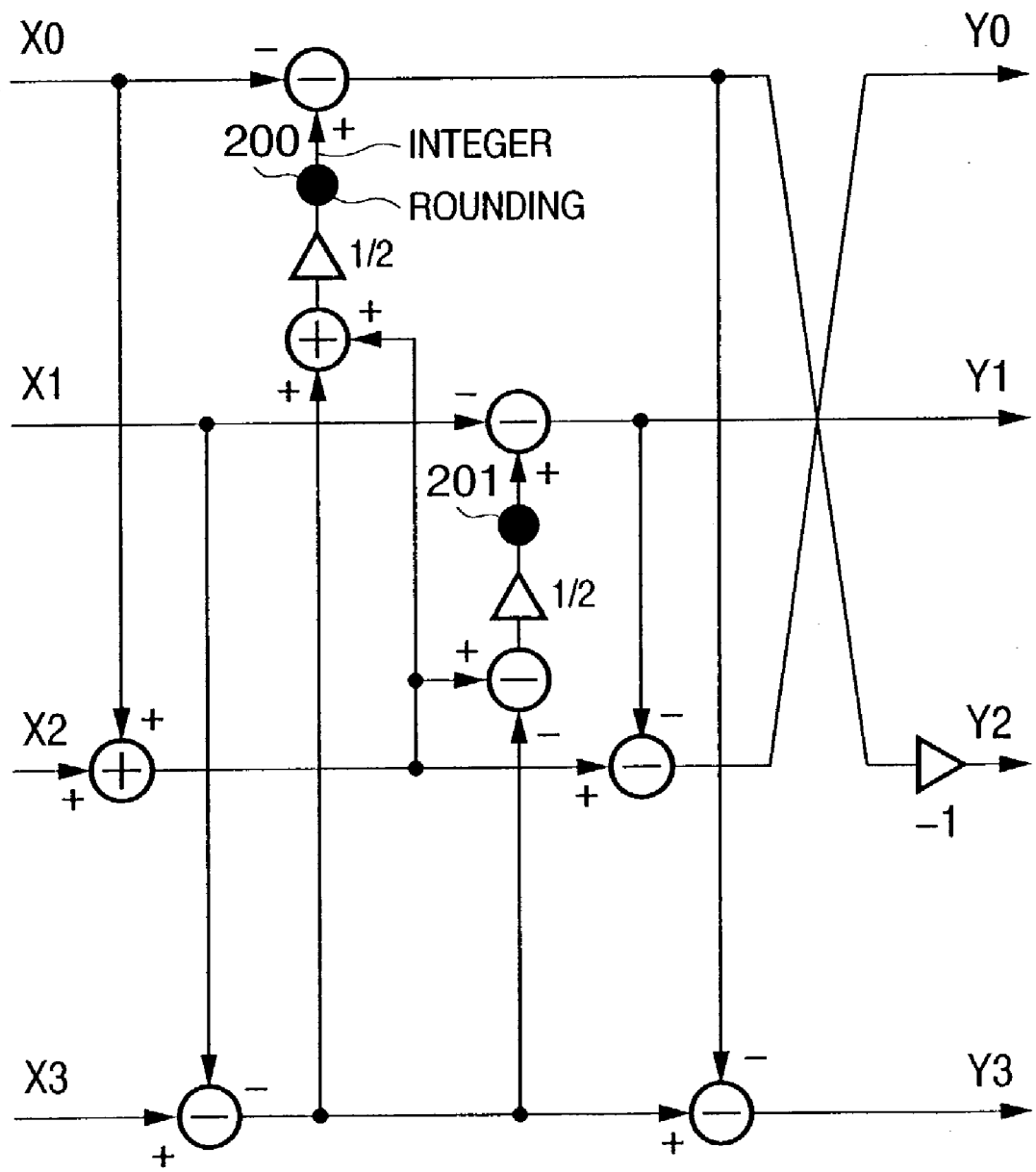
FIG. 2 is a diagram illustrating the signal flow of the conventional integer-type reversible Hadamard transformation.
Figure 3:
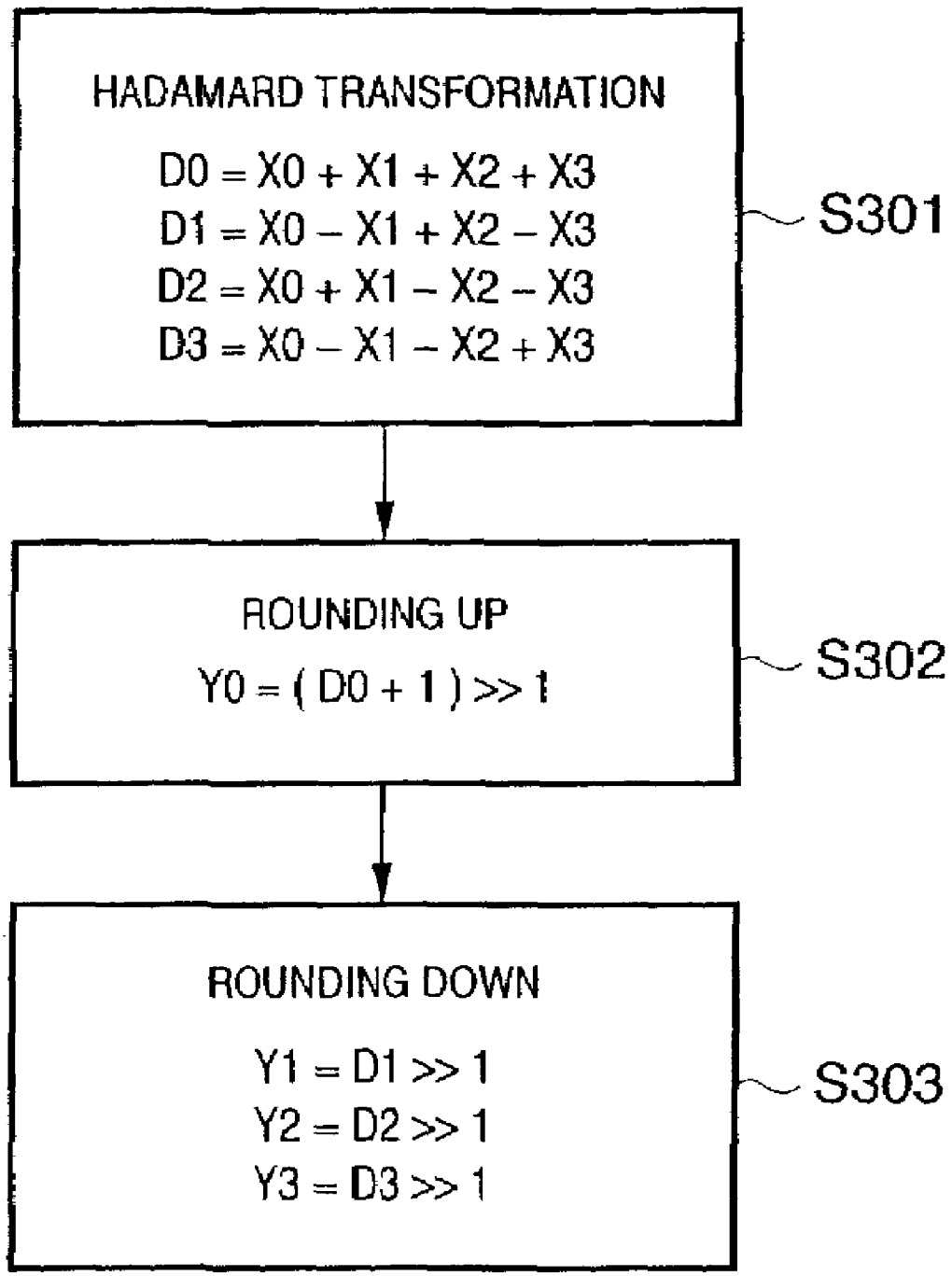
FIG. 3 is a flow chart illustrating steps in a reversible Hadamard transformation according to a first embodiment of the present invention.

FIG. 3 is a flow chart illustrating steps in a reversible Hadamard transformation according to a first embodiment of the present invention.

In FIG. 3, in a step S301, with fixed point arithmetic, a 4-point Hadamard transform matrix $H_4$ is used for transformation. The input data is Xi=[X0, X1, X2, X3] and a calculation shown as Di=$H_4$·Xi is executed. In a step S302, only the first (D0) of the transformation results obtained in step S301 is rounded up. Next, in a step S303, the remaining transformation results (D1, D2, D3) are each rounded down.

In step S301, 4-point Hadamard transformation using fixed point arithmetic is performed by adding and subtracting integer-type input data and substituting for the fixed-point variables. Here, the decimal fraction is only the last bit (hereinafter called the LSB, or least significant bit), whose weight is 0.5. In the rounding up process of step S302, after adding 1 to the first piece of data (D0), there is a shift 1 bit to the right. The added 1 is interpreted as having the same 0.5 weight as the LSB. The shift to the right 1 bit is to round down the decimal fraction of this addition result and leave only the integer part, so as to be transformed into integerized data.

In the rounding down process of the step S303, there is a shift to the right 1 bit without adding anything, which rounds down the decimal fraction of the transformation results of step S301 and leaving only the integer part, so as to be transformed into integerized data.

The rounding down and rounding up processes of the present embodiment are mathematical floor function calculations and mathematical ceiling function calculations. The former is a transformation to the largest integer that does not exceed the input data and the latter is a transformation to the smallest integer which is greater than or equal to the input data.

Viewed from another aspect, the values neither increase due to the rounding down process nor decrease due to the rounding up process. With the number "−7.5", for example, the result of rounding down is "−8" (which is smaller than the original value) and the result of rounding up is "−7" (which is larger than the original value).

In the present embodiment, the steps of the inverse transformation become the same as those shown in the flow chart of FIG. 3. Thus, for the four data mentioned previously, namely 123, 78, 84, 56 the application of the integer-type reversible Hadamard transform of the present embodiment produces transformed date after rounding that looks like this:

171(=(123+78+84+56)/2 rounding up the first digit after the decimal point),

36(=(123−78+84−56)/2 rounding down the first digit after the decimal point),

30(=(123+78−84−56)/2 rounding down the first digit after the decimal point),

8(=(123−78−84+56)/2 rounding down the first digit after the decimal point)

An inverse transformation is performed on these transformation results in the order shown in the flow chart of FIG. 3, to obtain the following values:

171, 36, 30, 8

Performing just an Hadamard inversion transformation on the foregoing results produces the following:

122.5(=(171+36+30+8)/2)
78.5(=(171−36+30−8)/2)
84.5(=(171+36−30−8)/2)
56.5(=(171−36−30+8)/2)

If the LSB of the first datum (122.5) is rounded up and the LSB of the rest of the data (78.5, 84.5, 56.5) is rounded down, the following values are obtained:

123, 78, 84, 56

In other words, the data reverts to its original state. Why this type of reversible transformation can be achieved is explained below.

It is well known that the values of the LSB of the four pieces of data that are Hadamard transformed by the fixed point arithmetic of step S301 of FIG. 3 all become the same. These LSB values are uniquely determined by how many odd-numbered data there are in the four pieces of data prior to transformation. In other words, if there are even number of the odd-numbered data, then the LSB value becomes 0, and if there are odd number of the odd-numbered data, then the LSB value becomes 1.

If the LSB value is 0, then the decimal fraction becomes zero, so integer data is already present at the output of the transformation of step S301. Accordingly, no error is generated by the rounding in the succeeding steps S302 and S303. In this case, in an inverse transformation as well, integer data is produced only with the transformation of step S301, and the data is restored to its original state regardless of whether there is rounding or not.

On the other hand, in the transformation of step S301, if the LSB value is 1 (in the case of 0.5), then rounding to the nearest integer imposes an error of "+0.5" or "−0.5" on the data. By processing the 4 sets of data shown in FIG. 3, an error of "+0.5" is imposed on the first transformation data Y0 and an error of "−0.5" is imposed on the remaining three sets of data Y1, Y2 and Y3.

If such error-imposed transformation data is inverse-processed according to the steps shown in FIG. 3, then the error is propagated to the pre-rounded transformation data D0 (error "−0.5") and D1, D2 and D3 (error "+0.5"). In order to negate this propagated error, only D0 is rounded up while the remaining three sets of data D1, D2 and D3 are rounded down. In step S302 and step S303, performing such processes restores the data to its original state.

Accordingly, the process depicted in FIG. 3 makes possible not only an integer-type reversible Hadamard transform but also an inverse transform.

The only case in which a transformation and an inverse transformation can be achieved with the same process is an instance in which only the rounding of the first transformation data differs from the rounding of the other three sets of data. There is one other type of process in which the rounding of the transformation data Y0 is different from those of the other three sets of data, and that is a process in which only Y0 is rounded down and the remaining three are rounded up. In this instance as well, however, both transformation and inverse transformation can be achieved with the same process.

It should be noted that the process shown in FIG. 3 can be varied, and transformation and rounding can be carried out simultaneously.

[Second Embodiment]

Figure 5:
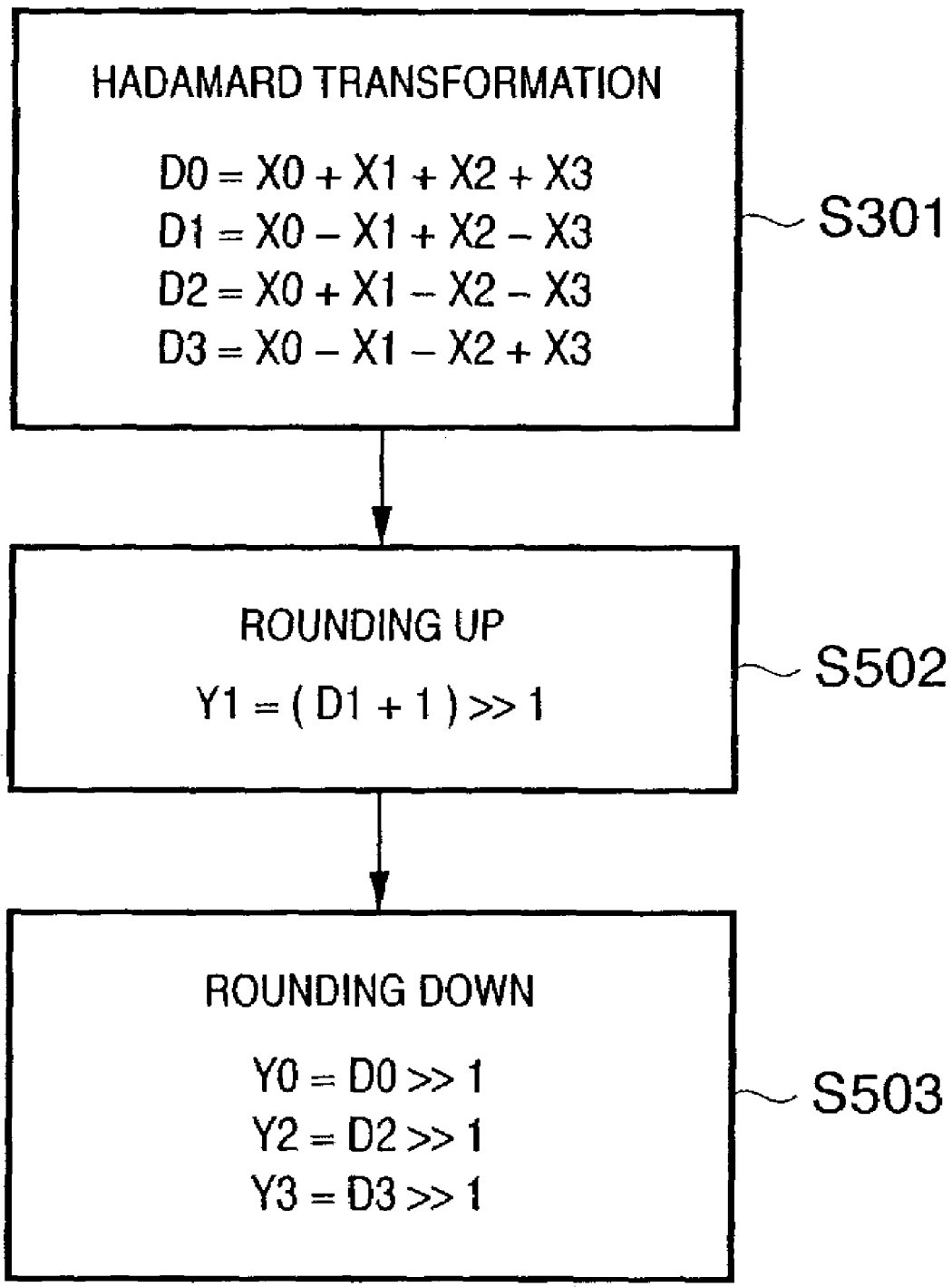
FIG. 5 is a flow chart illustrating steps in a reversible Hadamard transformation according to a second embodiment of the present invention.
Figure 6:
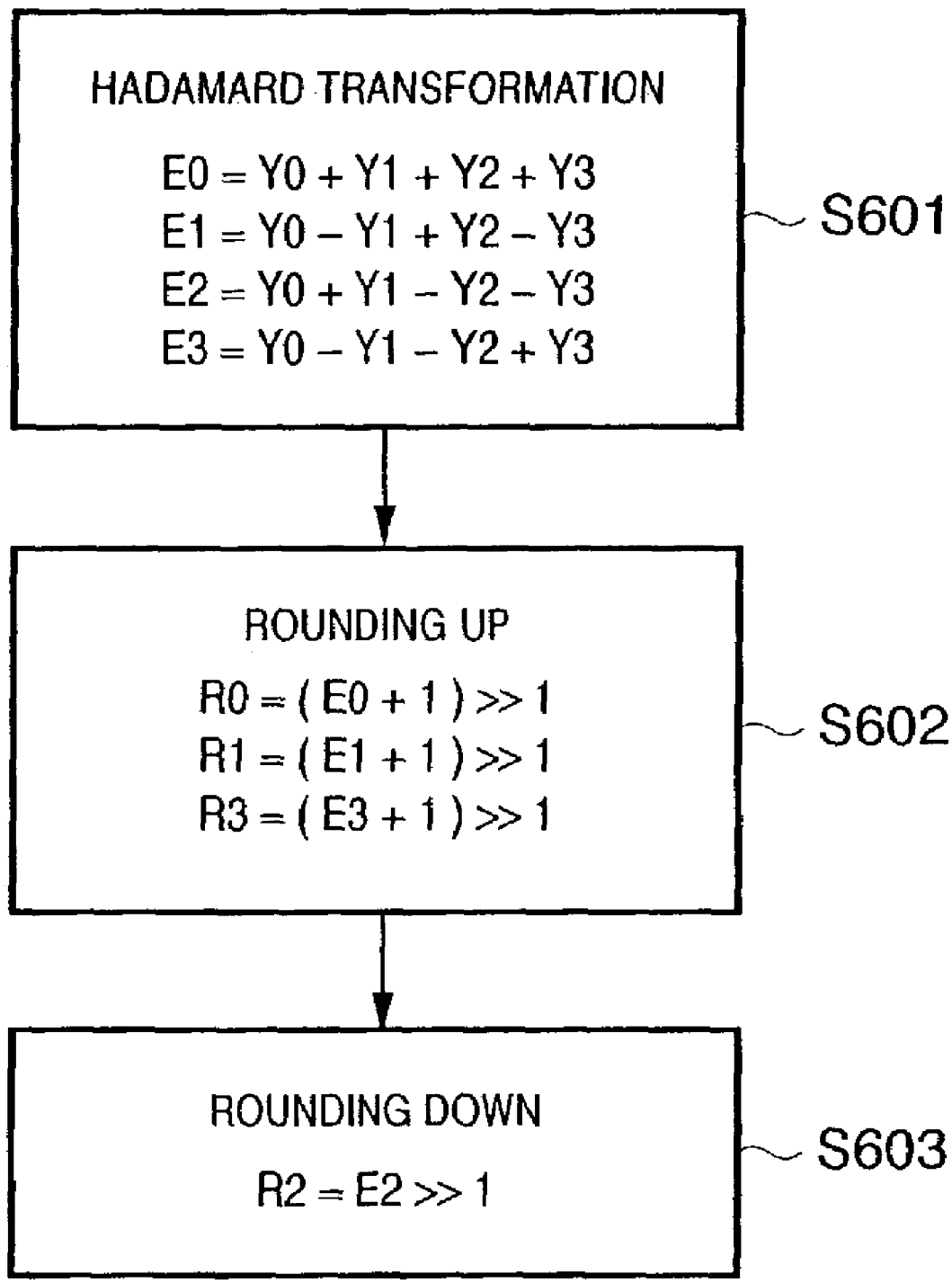
FIG. 6 is a flow chart illustrating steps in a inverse transformation of a reversible transform according to a second embodiment of the present invention.

FIG. 5 is a flow chart illustrating steps in a reversible Hadamard transformation according to a second embodiment of the present invention. FIG. 6 is a flow chart illustrating steps in a inverse transformation of a reversible transform according to a second embodiment of the present invention.

A second embodiment of the present invention will now be described using a case in which the rounding of the transformation and the rounding of the inverse transformation are different. In the second embodiment of the present invention, only the second transformation data (D1) is rounded up, while the remaining three sets of data (D0, D2, D3) are rounded down. As noted above, steps in the process of transformation of the second embodiment of the present invention are shown in FIG. 5 and steps in the process of inverse transformation of the second embodiment of the present invention are shown in FIG. 6.

With the second embodiment of the present invention as well, as with the first embodiment described above, in the fixed point arithmetic of step S301, if the LSB of the four calculation results is 1 then there is a problem with reversibility. When the LSB is 0, no error is generated during rounding and so an inverse transformation is possible.

Accordingly, the following is an explanation only with respect to a case in which the LSB is 1.

According to the process shown in FIG. 5, an error of +0.5 is imposed only on the second transformation data Y1, with an error of −0.5 imposed on the remaining transformation data Y0, Y2 and Y3.

Inverse transformation of the foregoing according to the flow depicted in FIG. 6 first propagates an error of +0.5 for only the third transformation data E2 by the fixed point arithmetic transformation of a step S601 and propagates an error of −0.5 for the remaining three transformation data E0, E1, E3.

Accordingly, in a step S602, the LSB of each of the transformation data E0, E1, E3 is rounded up and in a step S603 the LSB of the third transformation data E2 is rounded down. As a result, the error is eliminated so as to be able to obtain the original data R0–R3 prior to transformation.

[Third Embodiment]

FIGS. 7A, 7B and 7C are diagrams illustrating errors generated by rounding during a reversible Hadamard transformation of 8 sets, errors propagated by the inverse transformations corresponding to the transformations, and errors generated by rounding during said inverse transformations, respectively, according to a third embodiment of the present invention.

A third embodiment of the present invention uses neither a natural type nor a Walsh-type transform but the previously described one other transformation matrix (5):

$$HH4 = \frac{1}{2}\begin{bmatrix} 1 & 1 & 1 & 1 \\ 1 & -1 & -1 & 1 \\ 1 & -1 & 1 & -1 \\ 1 & 1 & -1 & -1 \end{bmatrix} \quad (5)$$

This matrix is one in which permutation of the base vector of the fourth line of a natural-type matrix is performed twice and the result is moved to the second line. Using this type of transformation matrix produces integer-type Hadamard transformed transformation data S0, S1, S2, S3, with the eight types of reversible rounding (types 0 through 7) defined as follows:

A rounding type in which three of the transformation data are rounded up and one rounded down is assigned types 0–3, and a rounding type in which three of the transformation data are rounded down and only one rounded up is assigned to types 4–7. More precisely, when rounding down only one, in a case where one transformation data is Si, the rounding is type i. Similarly, when rounding up only one, in a case where one transformation data is Sj, the rounding type is type (j+4).

Using the above-described definitions, the type of rounding used in order to restore the data to its original state when type i rounding is used during transformation is the 8's complement of i. If, for example, a type 2 rounding is used during transformation, then the data can be restored to its original state by inverse transformation using rounding type 6, which is the 8's complement of 2.

As noted above, errors imposed on the four transformation output data by the rounding types 0–7 are shown in FIG. 7A, the propagated errors during inverse transformation are shown in FIG. 7B and the rounding processes used during inverse transformation to eliminate such propagated errors are shown in FIG. 7C.

By numbering the rounding processes during transformation from FIGS. 7A, 7B and 7C in the order of the third embodiment of the present invention, it can be seen that the type of rounding during transformation and the corresponding type of rounding during inverse transformation are 8's complements. It should be noted that, where transformation matrixes other than transformation matrix (5) are used, there are eight types of rounding during transformation and rounding during inverse transformation is uniquely determined. (However, that relation does not devolve to a simple rule like that described above)

[Fourth Embodiment]

A fourth embodiment of the present invention is shown as a hardware configuration that matches the transformation rounding processes and the inverse transformation rounding processes of the third embodiment of the present invention.

Figure 8:
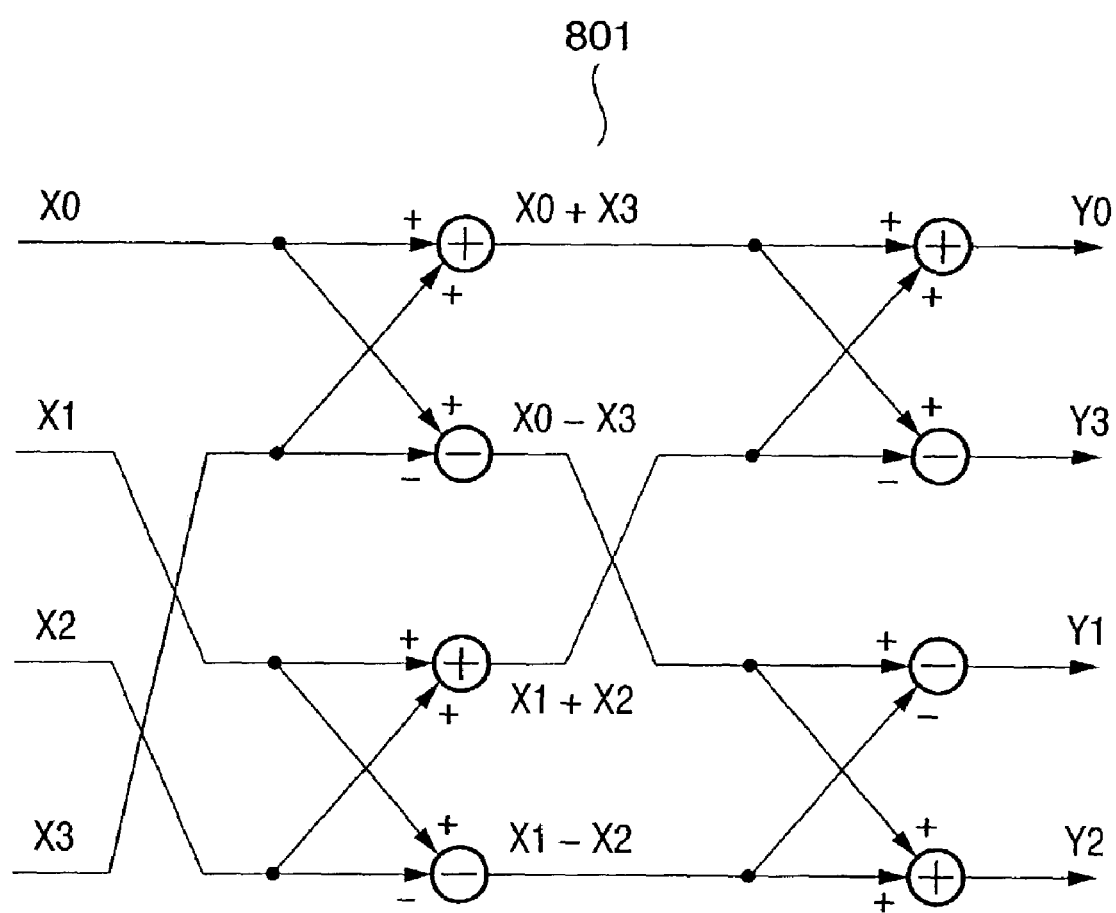
FIG. 8 is a block diagram showing the structure of a 4-point Hadamard transformation processing unit according to a fourth embodiment of the present invention.

FIG. 8 is a block diagram showing the structure of a Hadamard transformation processing unit according to a fourth embodiment of the present invention. In FIG. 8, reference numeral 801 denotes the Hadamard transformation processing unit, which is used for both transformation and inverse transformation.

Figure 9:
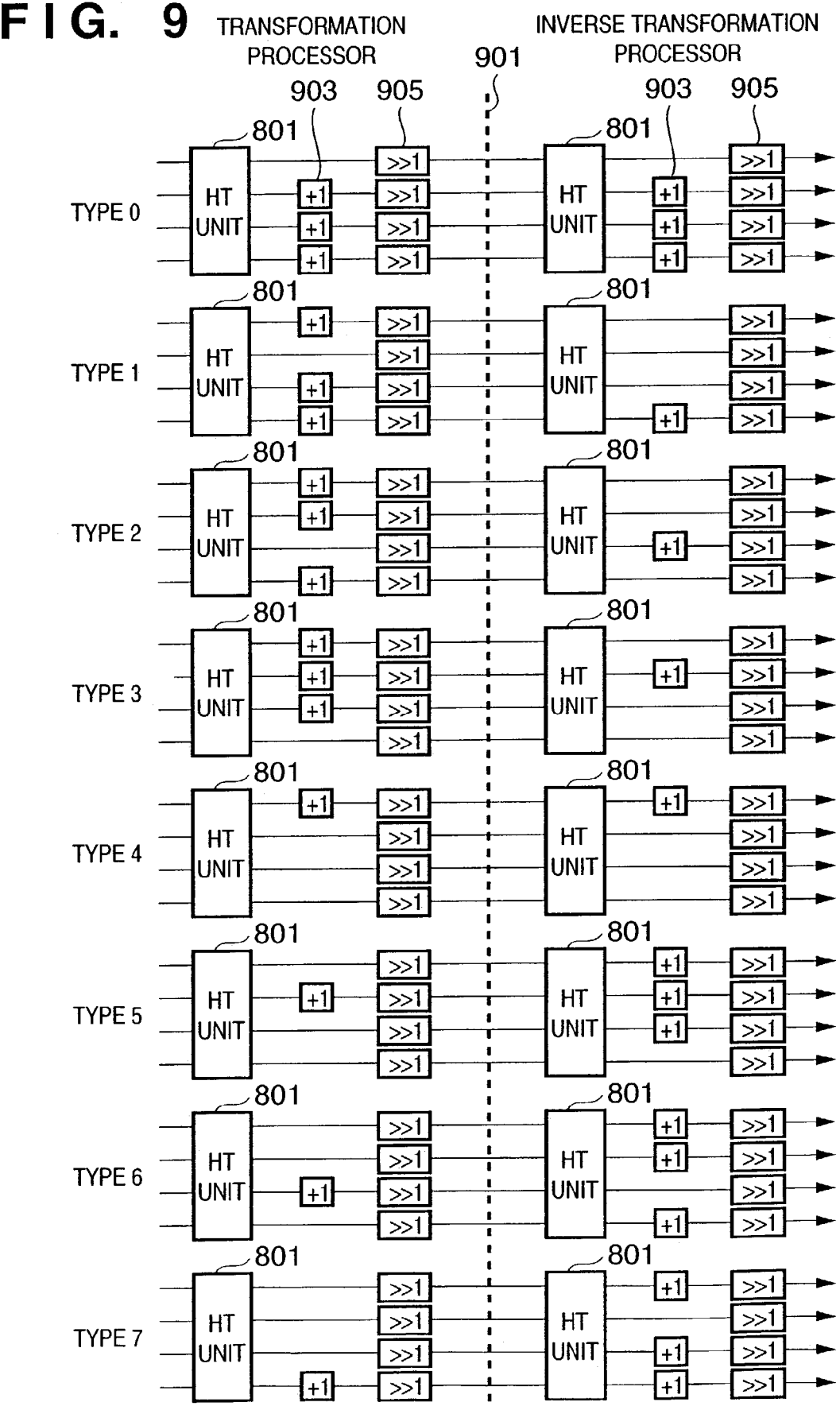
FIG. 9 is a diagram showing an 8-set reversible Hadamard transformation processor and each corresponding inverse transformation processor according to the fourth embodiment of the present invention.

FIG. 9 is a diagram showing an 8-set integer type of reversible Hadamard transformation processor and each corresponding inverse transformation processor according to the fourth embodiment of the present invention. In FIG. 9, the left side of the dotted line 901 indicates processes performed by the transformation processor and the right side of the dotted line 901 shows processes performed by the inverse transformation processor.

The unit group 903 that is at the initial stage of the output of the Hadamard transformation unit 801 is an adder that adds 1. The actual weight (that is, when converted into output result) of the 1 added here is 0.5. The second stage unit group 905 is a 1-bit shift unit for removing the LSB that is the decimal point so as to leave only the integer part. Physically, the decimal fraction is not connected and only the integer part is connected. This description holds for both the transformation unit and the inverse transformation unit.

[Fifth Embodiment]

Figure 10:
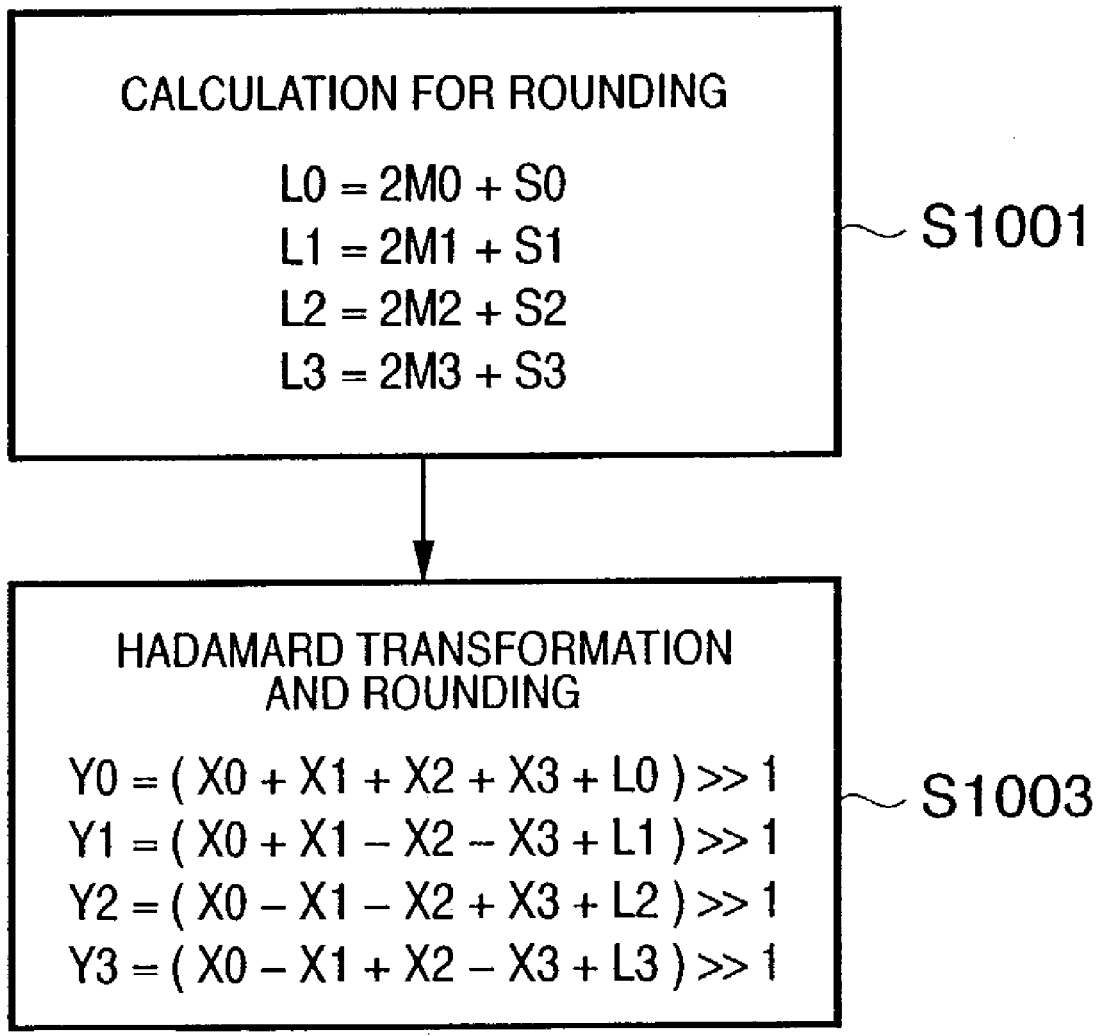
FIG. 10 depicts a diagram illustrating a Hadamard transformation according to a fifth embodiment of the present invention.

FIG. 10 depicts a diagram illustrating a Hadamard transformation according to a fifth embodiment of the present invention; and The fifth embodiment of the present invention does not limit the rounding process to just the two simple processes of rounding up and rounding down but is instead generalized. That is, during rounding, the process is not limited to either adding nothing (or, to put it another way, adding 0) or adding 1, but is instead able to add values other than 0 and 1. A transformation process that becomes an integer-type reversible Hadamard transform even when the added values are other than 0 or 1 is shown in FIG. 10, which is the transformation of this fifth embodiment. Although this transformation process uses a Walsh-Hadamard transformation matrix, it is possible to use any of the above-described three types of transformation matrixes.

In FIG. 10, in a step S100, Mi (where i=0, 1, 2, 3) is an integer, Si=0, 1 (i=0, 1, 2, 3) and S0+S1+S2+S3=1, 3. Under such conditions, the transformation of step S1003 of FIG. 8 becomes an integer-type reversible Hadamard transform. The limiting of Mi to 0 is as per the embodiments described above.

When performing a continuous reversible Hadamard transformation on data acquired using the same rounding process, the rounding process added value calculation step S1001 described above need only be carried out once in the beginning. Thereafter, the Hadamard transformation and rounding of step S1003 are carried out as many times as necessary.

[Sixth Embodiment]

Figure 11:
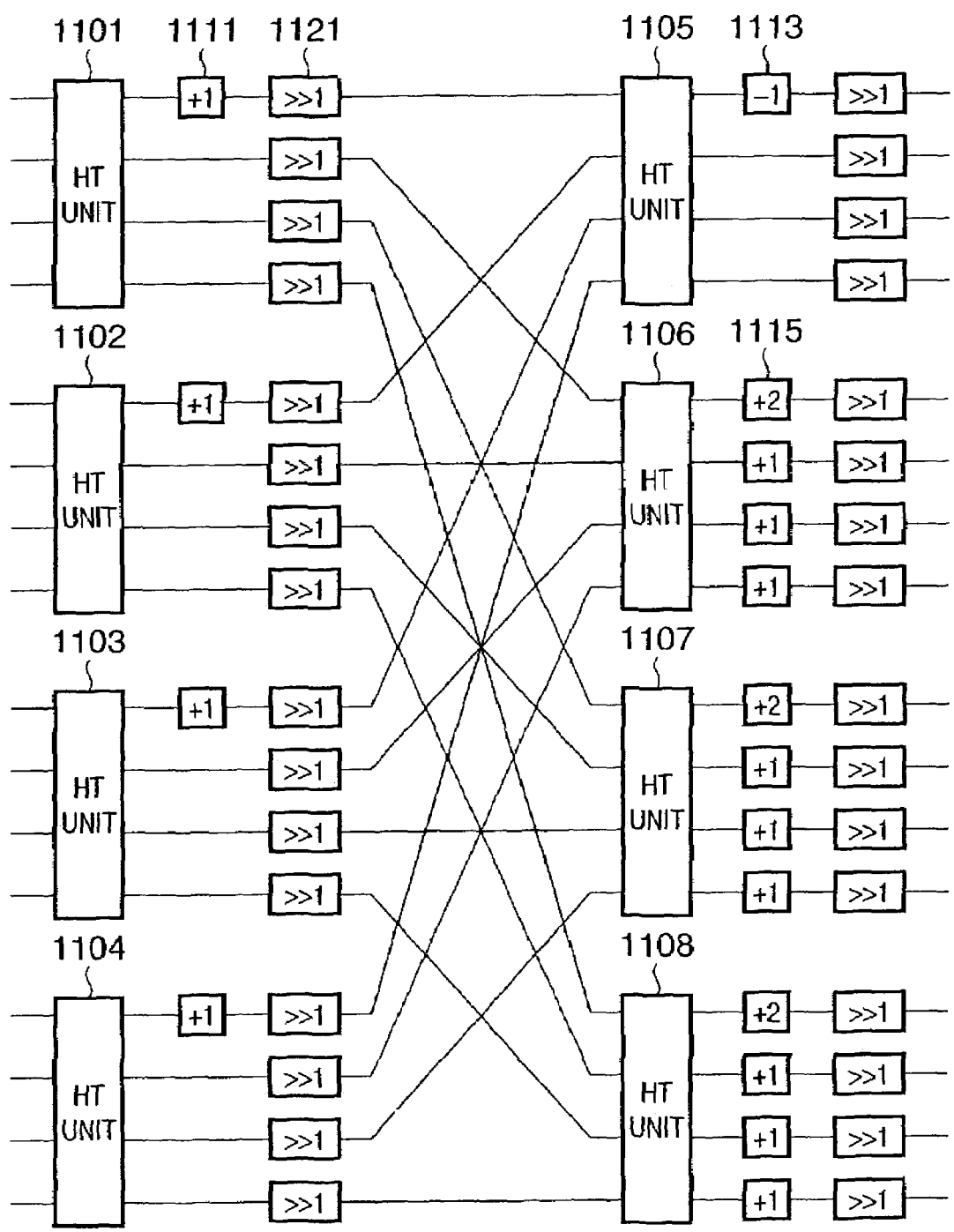
FIG. 11 depicts a diagram illustrating a Hadamard transformation according to a sixth embodiment of the present invention.

FIG. 11 depicts a diagram illustrating a Hadamard transformation according to a sixth embodiment of the present invention.

The fifth embodiment of the present invention described above is effective when carrying out integer-type reversible Hadamard transforms vertically no matter how many steps are involved. For 16-bit data, when the data is transposed in 4-bit units and further transformed in 4-bit units, it is useful in relaxing the margin of error, which concentrates locally. FIG. 11 shows one example of such a structure.

In the diagram, reference numerals 1101–1108 denote Hadamard transformation units (HT units). The transformation matrixes of these transformation units may be any of the three types described above. Reference numeral 1111 denotes an adding unit that adds 1, reference numeral 1113 denotes an adding unit that adds −1, reference numeral 1115 denotes an adding unit that adds 2 and reference numeral 1121 denotes a bit shift unit.

When configured as shown in FIG. 11, a perusal of the last four downstream HT units (that is, the four units shown at the right of the diagram) shows that rounded-up data concentrates at the HT unit 1105 and rounded-down data concentrates at the HT units 1106–1108. A margin of error of +0.5 is imposed on the rounded-up data while a margin of error of −0.5 is imposed on the rounded-down data.

When such data is further subjected to a Hadamard transformation, these margins of error concentrate at the transform coefficient Y0. That is, the margins of error imposed on the input data concentrate at the transform coefficient Y0 of the HT unit 1105, maximizing at +1. By contrast, at the other transformation coefficients Y1, Y2, Y3, the margin of error is cancelled out and averages out to 0. HT units 1106–1008 likewise experience a concentration of the imposed margins of error at the Y0 transformation coefficient, maximizing at −1, whereas the margins of error are canceled out at the other transformation coefficients Y1, Y2, Y3 to average out at 0.

One method of making the margin of error imposed on the output of the transformation coefficient Y0 at HT unit 1105 the same as the other transformation coefficients is by setting, in FIG. 10, M1=−1, S0=1 and the rest all 0. By using these settings, the margins of error imposed on the output transformation coefficients of all four transformation coefficients Y0, Y1, Y2 and Y3 are distributed over a range of from −1 to +0.5.

Similarly, one method of making the margin of error imposed on the output of the transformation coefficient Y0 of the HT units 1106–1108 the same as that of the other transformation coefficients is to set M1=1, S1=S2=S3=1 in the process shown in FIG. 10, while setting the rest to 0. By using these settings, the margins of error imposed on the output transformation coefficients of all four transformation coefficients Y0, Y1, Y2 and Y3 are distributed over a range of from −0.5 to +1.

The integer-type reversible Hadamard transform method and apparatus according to the fourth embodiment of the present invention can also be used to process a portion of a DCT transformation. In other words, a reversible DCT that outputs integer-type data suitable for high-speed processing can be achieved by replacing the Hadamard transformation processor with the reversible Hadamard transformation method of the present embodiment or with the reversible Hadamard transformation unit of the present embodiment.

Although the above-described Hadamard transformation method and apparatus has been described in terms of processing of one-dimension 4-point data, it can also be used to carry out secondary transformations of 4×4 two-dimensionally arrayed data as well, by applying the process in both the horizontal and vertical directions. Such a reversible Hadamard transform method and apparatus for two-dimensional data is of course within the scope of the present invention.

It should be noted that the present invention is equally applicable to a system comprising a plurality of components (such as a host computer, interface, reader, printer, and so on) as well as a system comprising but a single component (such as a copier, facsimile machine, or the like).

In addition, as can be appreciated by those of skill in the art, the object of the present invention may also be achieved by a software program code for achieving the functions of the foregoing embodiments being recorded onto a storage medium (or recording medium) that is supplied to a system or an apparatus, with a computer of that system or apparatus then reading the program code stored on the recording medium. In such a case, the program code read from the recording medium itself achieves the functions of the above-described embodiments, and the recording medium on which that program code is recorded constitutes the present invention. In addition, the present invention includes also an instance in which the execution of the program code read by the computer not only results in the achievement of the functions of the above-described embodiments but also the operating system (OS) operating in the computer performs part or all of the actual processing based on the instructions of the program code, with the functions of the above-described embodiments being achieved based on that processing.

Moreover, as can be appreciated by those of skill in the art, the present invention also includes an instance in which the functions of the above-described embodiments are achieved by processes executed in whole or in part by a CPU or the like provided in a function expansion card or a function expansion unit based on program code instructions, after the program code read from the recording medium is written to a memory provided in such a function expansion card inserted into the computer or such a function expansion unit connected to the computer.

As described above, according to the embodiments of the present invention, by performing a 4-point Hadamard transformation with a single matrix calculation, and of the 4 sets of data obtained by that transformation, rounding up the odd-numbered data LSB and rounding down the remaining odd-numbered data LSB, it is possible to achieve, at high speed using simple calculations, an integer-type reversible Hadamard transform as well as an inverse transformation corresponding to that transformation which restores the data to its original state.

Further, by simultaneously performing both rounding in such a way as to round up the odd-numbered transformation output results and round down the remaining odd-numbered transformation output, as well as transformation using the 4-point Hadamard transform matrix, it is possible to achieve, at high speed using simple calculations, an integer-type reversible Hadamard transform as well as an inverse transformation corresponding to that transformation which restores the data to its original state.

Similarly, by employing a 4-point Hadamard transformation unit (composed only of butterfly calculations), rounding up the odd-numbered output of such an Hadamard transformation unit and rounding down the remaining odd-numbered transformation output, it is possible to achieve, at high speed using simple calculations, an integer-type reversible Hadamard transform as well as an inverse transformation corresponding to that transformation which restores the data to its original state with little calculation delay.

The present invention is not limited to the above embodiments and various changes and modifications can be made within the spirit and scope of the present invention. Therefore, to apprise the public of the scope of the present invention, the following claims are made.

What is claimed is:

1. A computer-implemented Hadamard transformation method for encoding an image signal, comprising:
    a transformation step of performing a Hadamard transformation of the image signal using a Hadamard transform matrix;
    a rounding step of rounding up the least significant bit of odd number of data in the transformed data transformed in said transformation step and rounding down the LSB of remaining odd number of data; and
    a storing step of storing the rounded data from said rounding step as encoded image data.

2. The Hadamard transformation method according to claim 1, comprising a reversion step of restoring data to its original state by inverse transformation corresponding to said transformation step and rounding corresponding to said rounding step.

3. The Hadamard transformation method according to claim 2, wherein the rounding in said reversion step is uniquely determined for said rounding step and is the same rounding as is carried out in said rounding step.

4. The Hadamard transformation method according to claim 2, wherein the type of rounding in said rounding step and the type of rounding during inverse transformation in said reversion step are made to be complementary.

5. The Hadamard transformation method according to claim 1, wherein the Hadamard transform matrix is a 4-point Hadamard transform matrix.

6. The Hadamard transformation method according to claim 5, wherein eight types of rounding exist in said rounding step.

7. A computer-implemented Hadamard transformation method for decoding image data, comprising:
    an inverse transformation step of performing an inverse Hadamard transformation of encoded image data, the encoded image data having been encoded by performing a Hadamard transformation of original image data using a Hadamard transform matrix, to obtain a transformation output;
    a reversion step of restoring the transformation output to the original image data by performing rounding operations of rounding up the least significant bit of odd number of the transformation output and rounding down the LSB of remaining odd number of the transformation output, wherein the rounding operations are the same rounding operations performed in encoding the original image data; and
    a storing step of storing the restored data from said reversion step as decoded image data.

8. The Hadamard transformation method according to claim 7, wherein:
    eight types of rounding exist in said rounding operations; and
    the rounding in said reversion step is uniquely determined for the rounding in said rounding operations performed in encoding the original image data.

9. The Hadamard transformation method according to claim 7, wherein the rounding in said reversion step is made to have a 8's complementary relation with the rounding during eight types of transformations in said rounding operations performed in encoding the original image data.

10. A Hadamard transformation apparatus for encoding an image signal, comprising:
    Hadamard transformation means for performing a Hadamard transformation of the image signal using a Hadamard transform matrix; and
    rounding means for rounding up odd number of LSB of transformation output by said Hadamard transformation means and rounding down remaining odd number of transformation output LSB; and
    storing means for storing the rounded data from said rounding means as encoded image data.

11. The Hadamard transformation apparatus according to claim 10, further comprising reversion means for restoring data to its original state by inverse transformation corresponding to said Hadamard transformation means and rounding corresponding to said rounding means.

12. A Hadamard transformation apparatus for decoding image data, comprising:
    inverse transformation means for performing an inverse Hadamard transformation of encoded image data, the encoded image data having been encoded by performing a Hadamard transformation of original image data using a Hadamard transform matrix, to obtain a transformation output;

reversion means for restoring the transformation output to the original image data by performing rounding operations of rounding up the least significant bit of odd number of the transformation output and rounding down the LSB of remaining odd number of the transformation output, wherein the rounding operations are the same rounding operations performed in encoding the original image data: and storing means for storing the restored data from said reversion means as decoded image data.

13. A computer-executable program stored on a computer-readable medium that causes a computer to execute a Hadamard transformation method for encoding an image signal, comprising:

a transformation step of performing a Hadamard transformation of the image signal using a Hadamard transform matrix;

a rounding step of rounding up the least significant bit of odd number of data in the transformed data transformed in said transformation step and rounding down the least significant bit of remaining odd number of data; and a storing step of storing the rounded data from said rounding step as encoded image data.

14. A computer-readable recording medium on which is recorded a program that causes a computer to execute a Hadamard transformation method for encoding an image signal, comprising:

a transformation step of performing a Hadamard transformation of the image signal using a Hadamard transform matrix;

a rounding step of rounding up the least significant bit of odd number of data in the transformed data transformed in said transformation step and rounding down the least significant bit of remaining odd number of data; and a storing step of storing the rounded data from said rounding step as encoded image data.

15. A Hadamard transformation apparatus for encoding image data, comprising:

calculation means for adding and subtracting 4 integer input image data in accordance with a 4-point Hadamard transform matrix;

addition means for adding predetermined values to the transformed results by said calculation means and outputting the added data;

rounding means for rounding down the least significant bit of the added data outputted by said addition means; and storing means for storing the rounded data from said rounding means as encoded image data, wherein the predetermined values are 2Mi+Si (i=0, 1, 2, 3) wherein Mi is an integer number, Si is 0 or 1, and S0+S1+S2+S3=1 or 3.

16. A computer-implemented Hadamard transformation method for encoding image data, comprising the steps of:

adding and subtracting 4 integer input image data in accordance with a 4-point Hadamard transform matrix;

adding predetermined values to the Hadamard transformed results and outputting the added data;

rounding down the least significant bit of the added data; and storing the rounded data as encoded image data, wherein the predetermined values are 2Mi+Si (i=0, 1, 2, 3) wherein Mi is an integer number, Si is 0 or 1, and S0+S1+S2+S3=1 or 3.

17. A computer-executable program stored on a computer-readable medium that causes a computer to execute a Hadamard transformation method for encoding image data, comprising the steps of:

adding and subtracting 4 integer input image data in accordance with a 4-point Hadamard transform matrix;

adding predetermined values to the Hadamard transformed results and outputting the added data;

rounding down the least significant bit of the added data; and storing the rounded data as encoded image data, wherein the predetermined values are 2Mi+Si (i=0, 1, 2, 3) wherein Mi is an integer number, Si is 0 or 1, and S0+S1+S2+S3=1 or 3.

18. A computer-readable recording medium on which is recorded a program that causes a computer to execute a Hadamard transformation method for encoding image data, comprising the steps of:

adding and subtracting 4 integer input image data in accordance with a 4-point Hadamard transform matrix;

adding predetermined values to the Hadamard transformed results and outputting the added data;

rounding down the least significant bit of the added data; and storing the rounded data as encoded image data, wherein the predetermined values are 2Mi+Si (i=0, 1, 2, 3)

wherein Mi is an integer number, Si is 0 or 1, and S0+S1+S2+S3=1 or 3.

19. A decoding apparatus for decoding image data comprising:

input means for inputting encoded image data, the encoded image data resulting from a Hadamard transformation performed on original image data using a 4-point Hadamard transform matrix, rounding up of the least significant bit of odd-numbered transformation output of Hadamard transformed results, and rounding down of the LSB of remaining off-numbered numbered transformation output of the Hadamard transformed results;

inverse transformation means for performing an inverse Hadamard transformation of the encoded image data inputted by said input means;

reversion means for restoring the data to its original state by performing the same rounding as the rounding for the data inputted by said input means, to transformation results by said inverse transformation means; and storing means for storing the restored data from said reversion means as decoded image data.

20. A computer-implemented decoding method for decoding image data, comprising:

inputting encoded image data, the encoded image data resulting from a Hadamard transformation performed on original image data using a 4-point Hadamard transform matrix, rounding up of the least significant bit of odd-numbered transformation output of Hadamard transformed results, and rounding down of the LSB of remaining off-numbered numbered transformation output of the Hadamard transformed results;

performing an inverse Hadamard transformation of the encoded image data;

restoring the data to its original state by performing the same rounding as the rounding for the inputted data, to transformation results by said inverse Hadamard transformation; and storing the restored data as decoded image data.

21. A computer-readable recording medium on which is recorded a program that causes a computer to execute a decoding method for decoding image data, comprising the steps of:

inputting encoded image data, the encoded image data resulting from which a Hadamard transformation performed on original image data using a 4-point Hadamard transform matrix, rounding up of the least significant bit of odd-numbered transformation output of Hadamard transformed results, and rounding down of the LSB of remaining off-numbered numbered transformation output of the Hadamard transformed results;

performing an inverse Hadamard transformation of the encoded image data;

restoring the data to its original state by performing the same rounding as the rounding for the inputted data, to transformation results by said inverse Hadamard transformation; and storing the restored data as decoded image data.

22. A computer-executable program stored on a computer-readable medium that causes a computer to execute a decoding method for decoding image data, comprising the steps of:

inputting encoded image data, the encoded image data resulting from a Hadamard transformation performed on original image data using a 4-point Hadamard transform matrix, rounding up of the least significant bit of odd-numbered transformation output of Hadamard transformed results, and rounding down of the LSB of remaining off-numbered numbered transformation output of the Hadamard transformed results;

performing an inverse Hadamard transformation of the encoded image data;

restoring the data to its original state by performing the same rounding as the rounding for the inputted data, to transformation results by said inverse Hadamard transformation; and storing the restored data as decoded image data.

* * * * *

UNITED STATES PATENT AND TRADEMARK OFFICE
CERTIFICATE OF CORRECTION

PATENT NO. : 7,188,132 B2
APPLICATION NO. : 10/322598
DATED : March 6, 2007
INVENTOR(S) : Nakayama It is certified that error appears in the above-identified patent and that said Letters Patent is hereby corrected as shown below:

COLUMN 1:
Line 14, "vary large" should read -- very large --;
Lines 48 to 53,

"$H_N = H_{N/2} - H_2$ $= \dfrac{1}{\sqrt{2}} \begin{bmatrix} H_{w/2} & H_{w/2} \\ H_{w/2} & -H_{w/2} \end{bmatrix}$ " should read

-- "$H_N = H_{N/2} - H_2$ $= \dfrac{1}{\sqrt{2}} \begin{bmatrix} H_{N/2} & H_{N/2} \\ H_{N/2} & -H_{N/2} \end{bmatrix}$ --.

COLUMN 2:
Line 2, "forth line," should read -- fourth line, --.

COLUMN 6:
Line 1, "36(=123-" should read -- (new paragraph)36(=123- --.

COLUMN 13:
Line 60 claim 16, "and storing" should read -- and (new paragraph) storing --.

UNITED STATES PATENT AND TRADEMARK OFFICE
CERTIFICATE OF CORRECTION

PATENT NO. : 7,188,132 B2
APPLICATION NO. : 10/322598
DATED : March 6, 2007
INVENTOR(S) : Nakayama It is certified that error appears in the above-identified patent and that said Letters Patent is hereby corrected as shown below:

COLUMN 14:
Line 20 claim 18, " and storing" should read -- and (new paragraph) storing --;
Line 67 claim 21, "which" should be deleted.

Signed and Sealed this

Eighteenth Day of March, 2008

JON W. DUDAS
*Director of the United States Patent and Trademark Office*